(12) United States Patent
Gan

(10) Patent No.: US 10,488,191 B2
(45) Date of Patent: Nov. 26, 2019

(54) HIGH-STABILITY STEP GAUGE AND PREPARATION METHOD THEREFOR

(71) Applicant: Taixi Gan, Jiangsu Province (CN)

(72) Inventor: Taixi Gan, Jiangsu Province (CN)

( * ) Notice: Subject to any disclaimer, the term of this patent is extended or adjusted under 35 U.S.C. 154(b) by 216 days.

(21) Appl. No.: 15/842,069

(22) Filed: Dec. 14, 2017

(65) Prior Publication Data

US 2018/0259327 A1  Sep. 13, 2018

(30) Foreign Application Priority Data

Mar. 7, 2017 (CN) .......................... 2017 1 0130389

(51) Int. Cl.
| | |
|---|---|
| *G01B 5/008* | (2006.01) |
| *G01B 21/04* | (2006.01) |
| *G01B 3/30* | (2006.01) |
| *G01B 5/00* | (2006.01) |

(52) U.S. Cl.
CPC ........... *G01B 21/047* (2013.01); *G01B 3/303* (2013.01); *G01B 5/0004* (2013.01); *G01B 5/008* (2013.01); *G01B 21/042* (2013.01); *G01B 5/0011* (2013.01)

(58) Field of Classification Search
CPC .................................................. G01B 21/047
USPC ....................................... 33/503, 567, 567.1
See application file for complete search history.

(56) References Cited

U.S. PATENT DOCUMENTS

| | | | | |
|---|---|---|---|---|
| 4,584,774 A | * | 4/1986 | Link ........................ | G01B 3/30 33/202 |
| 5,671,541 A | * | 9/1997 | Dai .......................... | G01B 3/30 33/502 |
| 6,493,957 B1 | * | 12/2002 | Takatsuji ................. | G01B 1/00 33/502 |
| 10,352,678 B2 | * | 7/2019 | Yokoyama | |
| 2004/0036867 A1 | * | 2/2004 | Jedamzik ................. | G01B 1/00 356/243.1 |
| 2011/0162434 A1 | * | 7/2011 | Rastogi .................... | G01B 3/30 73/1.81 |
| 2018/0180396 A1 | * | 6/2018 | Hagino ................... | G01N 25/16 |
| 2018/0335290 A1 | * | 11/2018 | Narumi .................... | G01B 3/30 |

* cited by examiner

*Primary Examiner* — George B Bennett
(74) *Attorney, Agent, or Firm* — Locke Lord LLP; Tim Tingkang Xia, Esq.

(57) ABSTRACT

A high-stability step gauge and a preparation method therefor, where the step gauge has a base body, the base body includes a pillar carrier disposed along a coordinate direction, gauge block mounting blocks are distributed on the pillar carrier, and gauge pieces are fixedly mounted on the gauge block mounting blocks. The high-stability step gauge has good accuracy and stability, a small size, and strong functions. Deformation errors caused by the step gauge due to factors such as a weight of the base body are effectively and prominently reduced by means of reasonable combination of the base body and the gauge block mounting blocks. The preparation method thereof provides a stable length direction low deformation performance by using a cylindrical rigid support as the base body. The sleeved gauge block mounting blocks have high fixed mounting stability, and positioning and assembly of the gauge pieces are accurate.

10 Claims, 3 Drawing Sheets

HIGH-STABILITY STEP GAUGE AND PREPARATION METHOD THEREFOR

CROSS-REFERENCE TO RELATED PATENT APPLICATION

This application claims priority to and the benefit of, pursuant to 35 U.S.C. § 119(a), patent application Serial No. CN201710130389.5 filed in China on Mar. 7, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a step gauge for calibration of moving accuracy of a machine tool workbench and a coordinate measuring machine, and specifically relates to a high-accuracy and high-stability step gauge and a preparation method therefor.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A step gauge is also referred to as a pitch gauge or a ladder gauge. The step gauge is permanently fastened in a solid frame by arranging precise gauge pieces in a straight line, and can be used to detect moving accuracy of a machine tool workbench and calibrate a coordinate measuring machine, so as to adjust a machine tool to compensate errors and improve positioning accuracy of a device. The step gauge is composed of a series of measurement surfaces, a stable multi-indication material standard usually uses a solid frame or base body of a metal material, and to ensure accuracy and stability of gauge pieces on the base body, the base body usually uses a metal base body and directly fastens the gauge pieces thereon. The base body has a relatively large size, and deformation outside a length direction is relatively small. Therefore, to ensure accuracy, an existing step gauge is relatively heavy and has a relatively large volume and high manufacturing costs. In addition, because of limitation of a structure of the base body, a manufacturing process is relatively complex and cannot adapt to needs of development of a non-contact measurement technology. Secondly, precise gauge blocks are commonly used as measurement surface generation bodies and are hardly applicable to a non-contact measurement device such as a photographing-type measurement device.

SUMMARY

The present invention provides a high-stability step gauge that has good accuracy and stability, a small size, and strong functions. Deformation errors caused by the step gauge due to factors such as a weight of the base body are effectively and prominently reduced by means of reasonable combination of the base body and the gauge block mounting blocks, and miniaturization design of the specification of the base body can be implemented according to this, reducing a material using amount and the weight of the step gauge and providing a high-stability and high-accuracy checking material.

The present invention further provides a method for preparing a simple and efficient high-stability step gauge with low costs, which provides a stable length direction low deformation performance by using a cylindrical rigid support as the base body. The sleeved gauge block mounting blocks have high fixed mounting stability, and positioning and assembly of the gauge pieces are accurate.

Technical solutions used by the present invention are as follows:

A high-stability step gauge, where the step gauge has a base body, the base body includes a pillar carrier disposed along a coordinate direction, gauge block mounting blocks are distributed on the pillar carrier, and gauge pieces are fixedly mounted on the gauge block mounting blocks.

Specifically, the pillar carrier is a cylindrical or cylinder-shaped rigid support.

In an implementation, the pillar carrier is a carbon fiber cylindrical body with an integrated structure.

In another implementation, the gauge block mounting block includes an annular sleeving part, the annular sleeving part is sleeved and fastened on the pillar carrier, a gauge block fixed mounting part is disposed on the annular sleeving part, and gauge pieces are fastened on the gauge block fixed mounting part.

In still another implementation, an annular rubber gasket is assembled between the annular sleeving part and the pillar carrier, and a joint surface of the annular sleeving part and the pillar carrier is provided with an adhesive layer.

In an implementation, a base is separately sleeved and fastened on two ends of the pillar carrier, standard balls distributed in a straight line with the gauge pieces are assembled on the base, and the gauge pieces include gauge blocks and the standard balls.

The present invention further provides a method for preparing a high-stability step gauge, where the preparation method includes:

using a pillar carrier extending along a coordinate direction as a base body of the step gauge, where the pillar carrier is a cylindrical rigid support, gauge block mounting blocks are distributed and sleeved on a ring surface of the pillar carrier, gauge pieces are fixedly mounted on the gauge block mounting blocks, and the gauge pieces are arranged and disposed along a straight line; and the cylindrical rigid support is a carbon fiber cylindrical body with an integrated structure.

Specifically, the preparation method further includes:

disposing an annular sleeving part in the gauge block mounting block, mounting an annular high polymer gasket between an external ring surface of the pillar carrier and the annular sleeving part when the gauge block mounting block is fastened outside the pillar carrier, and injecting an adhesive by using a glue injection hole disposed outside the annular sleeving part to form a fixed connection.

In an implementation, the preparation method further includes:

distributing, fastening, and assembling a base on two ends of the pillar carrier, where annular sleeving and fastening holes of the pillar carrier are disposed on the base, an end surface of the base is provided with a carrying surface, standard balls are mounted another end surface opposite to the end surface, and the standard ball and the gauge pieces are arranged and disposed along a straight line.

In an implementation, the preparation method further includes:

the gauge pieces include gauge blocks and standard balls, where the standard ball and the gauge blocks are distributed at intervals.

In the high-stability step gauge and the preparation method, the pillar carrier is used as the base body, and the gauge pieces are indirectly fastened on the base body by using the gauge block mounting blocks. In this way, low-weight deformation and deformation affected by extremely small external factors can be provided to the step gauge by selection of a cylindrical or cylinder-shaped rigid support, which has low errors and high accuracy. In a specific implementation, a carbon fiber cylindrical body with an integrated structure may be used as the base body. The carbon fiber cylinder has a relatively good anti-weight-deformation capability, and a thickness of the carbon fiber cylinder may be increased according to a deformation amount. In addition, a gauge block mounting part does not need to be additionally set on a main body, process and industrial difficulty of the base body is relatively low. In a preferable implementation, the gauge block mounting blocks are fixedly connected to the base body in a sleeving manner. An annular high polymer or rubber gasket may be first sleeved outside the carbon fiber cylindrical body, the gauge block mounting blocks are sleeved outside the gasket, and an adhesive is injected to the fiber cylindrical body to form an adhesive filling layer. By means of connection between the gauge block mounting blocks and the carbon fiber cylinder in a sleeved manner, the gauge pieces may be distributed in a straight line on the base body, and accuracy and stability of mounting and positioning are high. A gauge block fixed mounting part for fixedly mounting the gauge pieces is provided on the gauge block mounting block to fixedly mount the gauge blocks. Another focus of the present invention is: the gauge pieces distributed in a straight line are disposed in a manner of distributing the standard balls and the gauge blocks at intervals. A standard ball is disposed at an interval of several gauge blocks. For a non-contact coordinate measuring device, especially a photographing-type measuring device, two distances between centers of balls are obtained by measuring sizes and surfaces of the balls. No matter at which position a measured object is placed, compared with measurement of planes, measurement of ball surfaces and sizes more easily reflects real accuracy of a coordinate measuring device and more effectively reflects comprehensive measurement accuracy of the coordinate measuring device including probe errors. Setting of a combination of the gauge blocks and standard balls can expand the applicable scope of the step gauge and provides check demands of multiple coordinate measuring devices with multiple specifications.

Beneficial effects of the present invention are: the high-stability step gauge has good accuracy and stability, a small size, and strong functions, deformation and other errors under impact of itself and an external environment, and miniaturization design of the specification of the base body can be implemented, reducing a material using amount and the weight of the step gauge. The method for preparing a high-stability step gauge is simple and efficient and has low costs, and provides a stable length direction low deformation performance by using a cylindrical rigid support as the base body. The sleeved gauge block mounting blocks have high fixed mounting stability, and positioning and assembly of the gauge pieces are accurate.

The present utility is further described below with reference to the accompanying drawings and specific implementations.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1A:
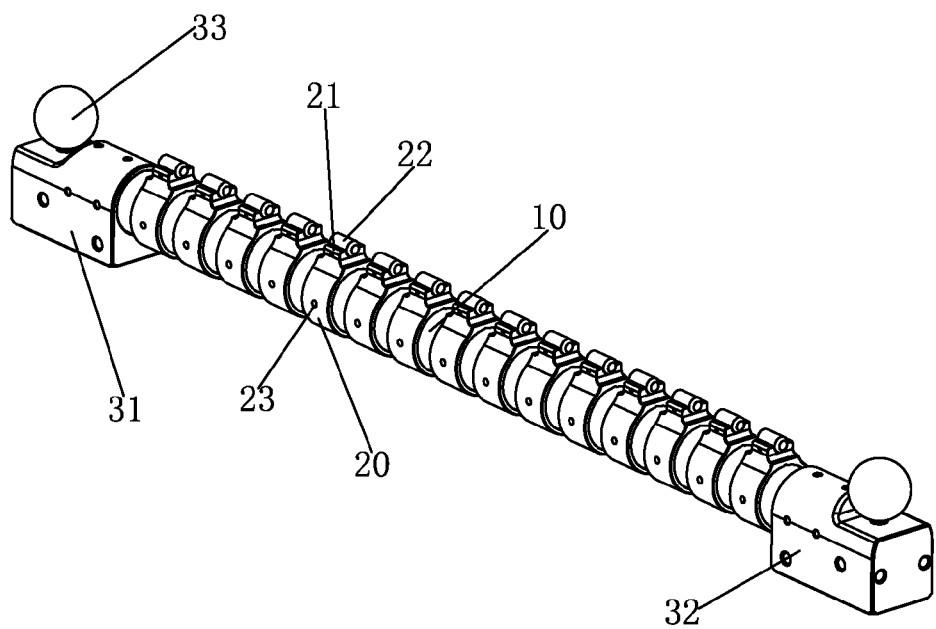
FIG. 1A is a schematic diagram of a whole structure of a specific implementation of a high-stability step gauge according to the present invention.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The high-stability step gauge mainly implements functional focusing of a base body and gauge block mounting blocks of a whole step gauge by using a pillar carrier disposed along a coordinate direction as the base body and distributing the gauge block mounting blocks on the pillar carrier, improving whole stability.

Figure 1B:
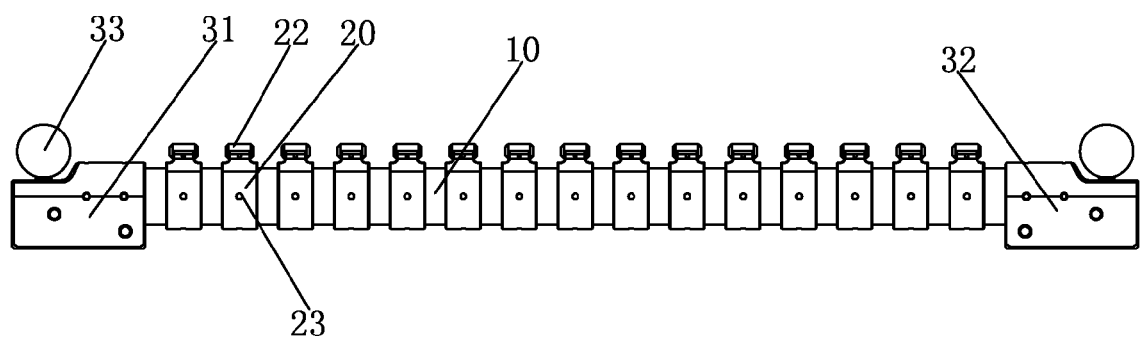
FIG. 1B is another schematic structural diagram of the high-stability step gauge in FIG. 1A.

In the high-stability step gauge shown in FIG. 1A and FIG. 1B, the base body thereof is a pillar carrier disposed along a coordinate direction. The pillar carrier is a cylindrical or cylinder-shaped rigid support. The pillar carrier 10 is a carbon fiber cylindrical body with an integrated structure, and a thickness of a cylinder wall of the carbon fiber cylindrical body is greater than a size of an inner diameter. When the pillar carrier 10 is set up at two ends and is placed horizontally, deformation of a weight of the pillar carrier 10 is extremely small and is about 5% of a deformation degree of a high-performance steel material with a same size. Multiple gauge block mounting blocks are arranged and fastened on a outer cylinder wall of the carbon fiber cylindrical body, and gauge pieces are fixedly mounted on the gauge block mounting blocks. The gauge block mounting block 20 has an annular sleeving part. The gauge block mounting block is fastened on the pillar carrier 10 by sleeving the annular sleeving part. A gauge block fixed mounting part 21 is disposed on each gauge block mounting block 20. The gauge pieces 22 are fastened on the gauge block fixed mounting part. The gauge pieces 22 are gauge blocks. An annular rubber gasket is assembled between the annular sleeving part and the pillar carrier, and a joint surface of the annular sleeving part and the pillar carrier is provided with an adhesive layer (not shown in the figure). The adhesive layer may perform injection by using a glue injection hole 23 disposed in the gauge block mounting block. Bases 31 and 32 are separately sleeved and fastened on two ends of the pillar carrier, and standard balls 33 distributed in a straight line with the gauge pieces are assembled on the bases.

During manufacturing, a pillar carrier extending along a coordinate direction is used as a base body of the step gauge, and the pillar carrier cylindrical rigid support is, for example, a carbon fiber cylindrical body with an integrated structure. Gauge block mounting blocks are distributed and sleeved on a ring surface of the pillar carrier. The gauge block mounting block fixedly mount gauge pieces, and the gauge pieces are arranged and disposed along a straight line. The gauge block mounting block has an annular sleeving part. When the gauge block mounting block is fastened outside the pillar carrier, an annular high polymer gasket is mounted between an external ring surface of the pillar carrier and the annular sleeving part, and an adhesive is injected by using a glue injection hole disposed outside the annular sleeving part to form a fixed connection. A base is distributed, fastened, and assembled on two ends of the pillar carrier. Annular sleeving and fastening holes of the pillar carrier are disposed on the base, an end surface of the base is provided with a carrying surface, standard balls are mounted another end surface opposite to the end surface, and the standard ball and the gauge pieces are arranged and disposed along a straight line.

Figure 2A:
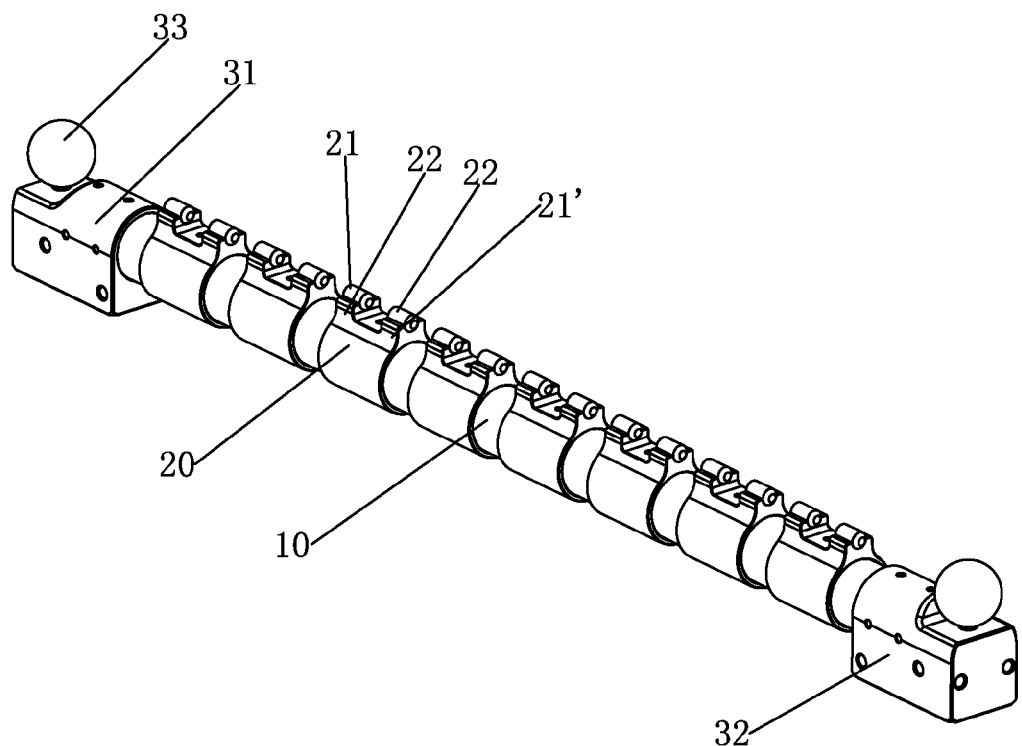
FIG. 2A is a schematic diagram of a whole structure according to another specific implementation of the present invention.
Figure 2B:
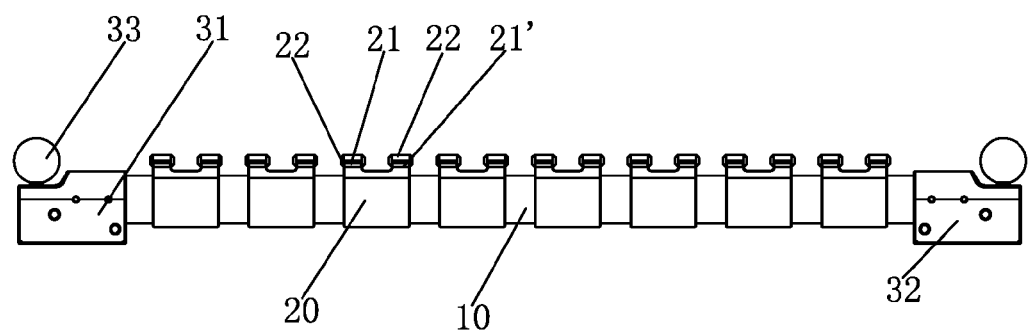
FIG. 2B is another schematic structural diagram of the high-stability step gauge in FIG. 2A.

In another implementation, as shown in FIG. 2A and FIG. 2B, the base body of the high-stability step gauge is a pillar carrier disposed along a coordinate direction. The pillar carrier is a cylindrical or cylinder-shaped rigid support. The pillar carrier 10 is a carbon fiber cylindrical body with an integrated structure, and a thickness of a cylinder wall of the carbon fiber cylindrical body is greater than a size of an inner diameter. When the pillar carrier 10 is set up at two ends and is placed horizontally, deformation of a weight of the pillar carrier 10 is extremely small and is about 5% of a deformation degree of a high-performance steel material with a same size. Multiple gauge block mounting blocks are arranged and fastened on a outer cylinder wall of the carbon fiber cylindrical body, and gauge pieces are fixedly mounted on the gauge block mounting blocks. The gauge block mounting block 20 has an annular sleeving part. The gauge block mounting block is fastened on the pillar carrier 10 by sleeving the annular sleeving part. Two gauge block fixed mounting parts 21 and 21' are disposed on the gauge block mounting block 20. In this way, a utilization rate of the gauge block mounting blocks can be improved, and process difficulty is reduced. The gauge pieces 22 are fastened on two gauge block fixed mounting parts. The gauge pieces 22 are gauge blocks. An annular rubber gasket is assembled between the annular sleeving part and the pillar carrier, and a joint surface of the annular sleeving part and the pillar carrier is provided with an adhesive layer (not shown in the figure). The adhesive layer may perform injection by using a glue injection hole 23 disposed in the gauge block mounting block. Bases 31 and 32 are separately sleeved and fastened on two ends of the pillar carrier, and standard balls 33 distributed in a straight line with the gauge pieces are assembled on the bases.

During manufacturing, a pillar carrier extending along a coordinate direction is used as a base body of the step gauge, and the pillar carrier cylindrical rigid support is, for example, a carbon fiber cylindrical body with an integrated structure. Gauge block mounting blocks are distributed and sleeved on a ring surface of the pillar carrier. The gauge block mounting block fixedly mount gauge pieces, and the gauge pieces are arranged and disposed along a straight line. The gauge block mounting block has an annular sleeving part. When the gauge block mounting block is fastened outside the pillar carrier, an annular high polymer gasket is mounted between an external ring surface of the pillar carrier and the annular sleeving part, and an adhesive is injected by using a glue injection hole disposed outside the annular sleeving part to form a fixed connection. A base is distributed, fastened, and assembled on two ends of the pillar carrier. Annular sleeving and fastening holes of the pillar carrier are disposed on the base, an end surface of the base is provided with a carrying surface, standard balls are mounted another end surface opposite to the end surface, and the standard ball and the gauge pieces are arranged and disposed along a straight line.

Figure 3A:
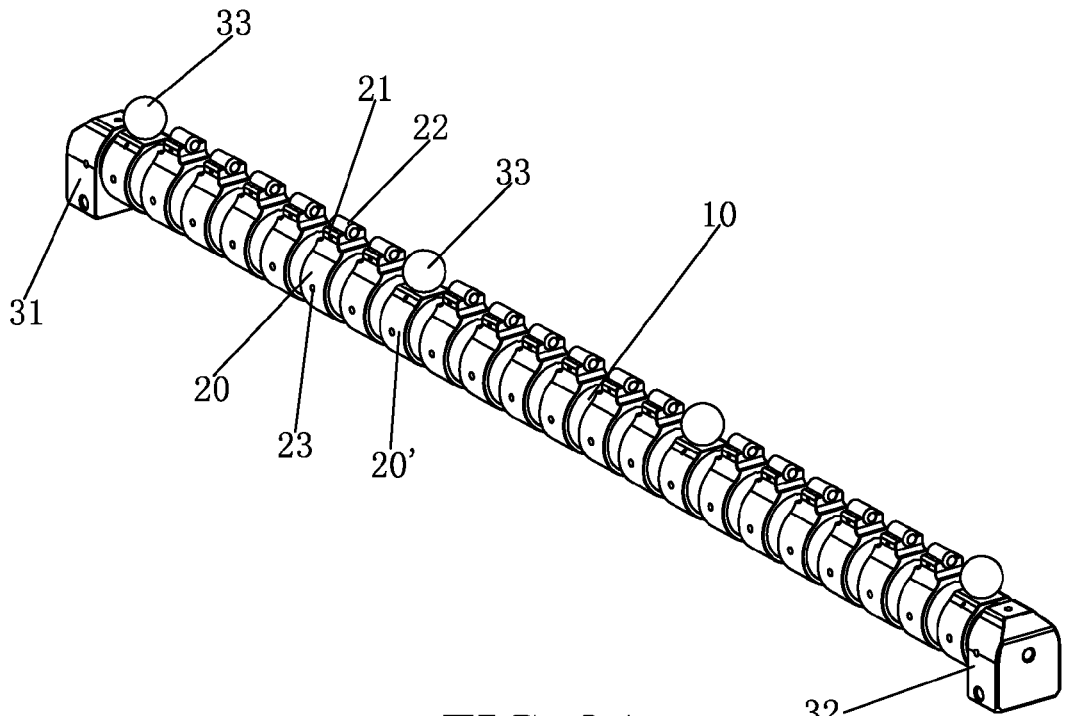
FIG. 3A is a schematic diagram of a whole structure according to still another specific implementation of the present invention.
Figure 3B:
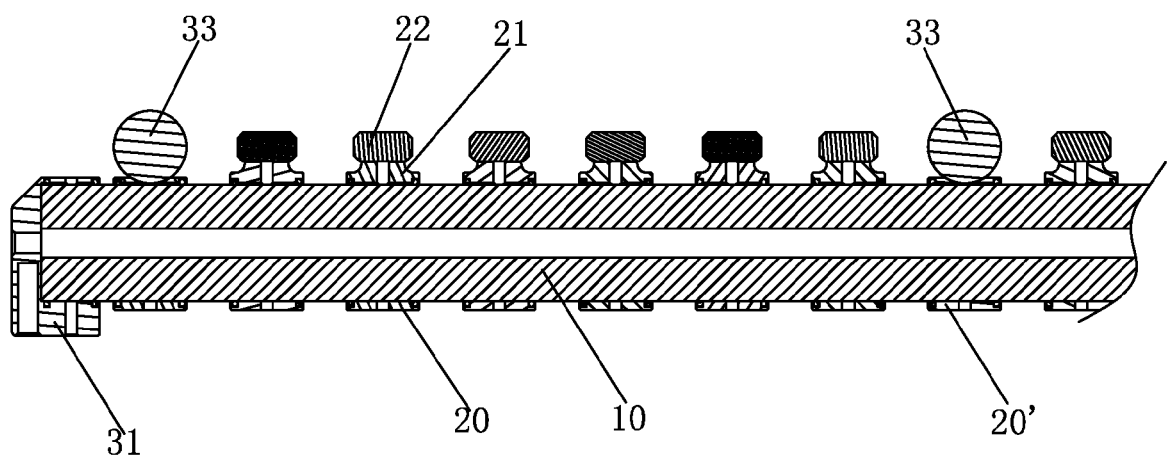
FIG. 3B is a schematic structural diagram of a part of a profile of the high-stability step gauge in FIG. 3A.

As shown in FIG. 3A and FIG. 3B, the base body of the high-stability step gauge is a pillar carrier disposed along a coordinate direction. The pillar carrier is a cylindrical or cylinder-shaped rigid support. The pillar carrier 10 is a carbon fiber cylindrical body with an integrated structure, and a thickness of a cylinder wall of the carbon fiber cylindrical body is greater than a size of an inner diameter. When the pillar carrier 10 is set up at two ends and is placed horizontally, deformation of a weight of the pillar carrier 10 is extremely small, and a thermal expansion coefficient is almost zero. Multiple gauge block mounting blocks are arranged and fastened on a outer cylinder wall of the carbon fiber cylindrical body, and gauge pieces are fixedly mounted on the gauge block mounting blocks. The gauge block mounting block 20 has an annular sleeving part. The gauge block mounting block is fastened on the pillar carrier 10 by sleeving the annular sleeving part. A gauge block fixed mounting part 21 is disposed on each gauge block mounting block 20. The gauge pieces are fastened on the gauge block fixed mounting part. The gauge pieces are gauge blocks 22 or standard balls 33, and the standard balls 33 and the gauge blocks 22 are arranged and disposed along a straight line. An advantage of arranging and mounting the gauge blocks and the standard balls both by using the gauge block fixed mounting part lies in that the gauge blocks and the standard balls are based on a same mounting structure, and accuracy and stability are relatively high.

The standard balls are disposed on all the gauge block mounting blocks on two ends of the pillar carrier 10, and a standard ball is disposed at an interval of several gauge blocks. An annular rubber gasket is assembled between the annular sleeving part and the pillar carrier, and a joint surface of the annular sleeving part and the pillar carrier is provided with an adhesive layer (not shown in the figure). The adhesive layer may perform injection by using a glue injection hole 23 disposed in the gauge block mounting block. Bases 31 and 32 are separately sleeved and fastened on two ends of the pillar carrier.

During manufacturing, a pillar carrier extending along a coordinate direction is used as a base body of the step gauge, and the pillar carrier cylindrical rigid support is, for example, a carbon fiber cylindrical body with an integrated structure. Gauge block mounting blocks are distributed and sleeved on a ring surface of the pillar carrier. The gauge block mounting block fixedly mount gauge pieces, and the gauge pieces are arranged and disposed along a straight line. The gauge block mounting block has an annular sleeving part. When the gauge block mounting block is fastened outside the pillar carrier, an annular high polymer gasket is mounted between an external ring surface of the pillar carrier and the annular sleeving part, and an adhesive is injected by using a glue injection hole disposed outside the annular sleeving part to form a fixed connection. A base is distributed, fastened, and assembled on two ends of the pillar carrier. Annular sleeving and fastening holes of the pillar carrier are disposed on the base.

The above detailed description only describes preferable embodiments of the present utility model, and is not intended to limit the patent scope of the present utility model, so any equivalent technical changes made by use of the specification of the creation and the content shown in the drawings fall within the patent scope of the creation.

What is claimed is:

1. A high-stability step gauge, wherein the step gauge has a base body, the base body comprises a pillar carrier disposed along a coordinate direction, gauge block mounting blocks are distributed on the pillar carrier, and gauge pieces are fixedly mounted on the gauge block mounting blocks.

2. The high-stability step gauge according to claim 1, wherein the pillar carrier is a cylindrical or cylinder-shaped rigid support.

3. The high-stability step gauge according to claim 2, wherein the pillar carrier is a carbon fiber cylindrical body with an integrated structure.

4. The high-stability step gauge according to claim 1, wherein the gauge block mounting block comprises an annular sleeving part, the annular sleeving part is sleeved and fastened on the pillar carrier, a gauge block fixed mounting part is disposed on the annular sleeving part, and gauge pieces are fastened on the gauge block fixed mounting part.

5. The high-stability step gauge according to claim 4, wherein an annular rubber gasket is assembled between the annular sleeving part and the pillar carrier, and a joint surface of the annular sleeving part and the pillar carrier is provided with an adhesive layer.

6. The high-stability step gauge according to claim 1, wherein a base is separately sleeved and fastened on two ends of the pillar carrier, standard balls distributed in a straight line with the gauge pieces are assembled on the base, and the gauge pieces comprise gauge blocks and the standard balls.

7. A method for preparing a high-stability step gauge, wherein the preparation method comprises:
   using a pillar carrier extending along a coordinate direction as a base body of the step gauge, wherein the pillar carrier is a cylindrical rigid support, gauge block mounting blocks are distributed and sleeved on a ring surface of the pillar carrier, gauge pieces are fixedly mounted on the gauge block mounting blocks, and the gauge pieces are arranged and disposed along a straight line; and
   the cylindrical rigid support is a carbon fiber cylindrical body with an integrated structure.

8. The method for preparing a high-stability step gauge according to claim 7, wherein the preparation method further comprises:
   disposing an annular sleeving part in the gauge block mounting block, mounting an annular high polymer gasket between an external ring surface of the pillar carrier and the annular sleeving part when the gauge block mounting block is fastened outside the pillar carrier, and injecting an adhesive by using a glue injection hole disposed outside the annular sleeving part to form a fixed connection.

9. The method for preparing a high-stability step gauge according to claim 7, wherein the preparation method further comprises:
   distributing, fastening, and assembling a base on two ends of the pillar carrier, wherein annular sleeving and fastening holes of the pillar carrier are disposed on the base, an end surface of the base is provided with a carrying surface, standard balls are mounted another end surface opposite to the end surface, and the standard ball and the gauge pieces are arranged and disposed along a straight line.

10. The method for preparing a high-stability step gauge according to claim 7, wherein the preparation method further comprises:
    the gauge pieces comprising gauge blocks and standard balls, wherein the standard ball and the gauge blocks are distributed at intervals.

* * * * *